US009914334B2

(12) United States Patent
Hlubina et al.

(10) Patent No.: US 9,914,334 B2
(45) Date of Patent: Mar. 13, 2018

(54) REAR STRUCTURE OF A MOTOR VEHICLE

(71) Applicant: RENAULT s.a.s., Boulogne Billancourt (FR)

(72) Inventors: Thierry Hlubina, Chaville (FR); Olivier Rioult, Voisins le Bretonneux (FR); Jerome Caillard, Gif sur Yvette (FR)

(73) Assignee: RENAULT s.a.s., Boulogne Billancourt (FR)

(*) Notice: Subject to any disclaimer, the term of this patent is extended or adjusted under 35 U.S.C. 154(b) by 0 days.

(21) Appl. No.: 15/126,778

(22) PCT Filed: Feb. 9, 2015

(86) PCT No.: PCT/FR2015/050299
§ 371 (c)(1),
(2) Date: Sep. 16, 2016

(87) PCT Pub. No.: WO2015/140427
PCT Pub. Date: Sep. 24, 2015

(65) Prior Publication Data
US 2017/0088190 A1 Mar. 30, 2017

(30) Foreign Application Priority Data
Mar. 18, 2014 (FR) ...................... 14 52226

(51) Int. Cl.
B62D 9/02 (2006.01)
B62D 25/20 (2006.01)
(Continued)

(52) U.S. Cl.
CPC ............ B60G 9/027 (2013.01); B60C 9/02 (2013.01); B62D 21/11 (2013.01); B62D 25/082 (2013.01);
(Continued)

(58) Field of Classification Search
CPC .... B60G 9/02; B60G 9/027; B60G 2200/324; B62D 25/2027; B62D 21/11; B62D 25/082; B62D 61/12
(Continued)

(56) References Cited

U.S. PATENT DOCUMENTS 3,001,600 A * 9/1961 MacPherson .......... B60G 9/027
180/353
3,239,235 A * 3/1966 Kozicki ................. B60G 9/027
267/66
(Continued)

FOREIGN PATENT DOCUMENTS

DE    838 112 C       7/1949
DE    4422875 A1 *    1/1996 ............. B60G 7/001
(Continued)

OTHER PUBLICATIONS

International Search Report dated May 6, 2015 in PCT/FR2015/050299 filed Feb. 9, 2015.
(Continued)

Primary Examiner — Laura Freedman
(74) Attorney, Agent, or Firm — Oblon, McClelland, Maier & Neustadt, L.L.P.

(57) ABSTRACT

A motor vehicle rear structure includes an underframe component for supporting a motor vehicle floor, an axle component including a central part and two lateral parts that define, with the central part, a space to accommodate a component of the vehicle, and a pivot member including a first pivot element and a second pivot element which are able to pivot relative to one another. The rear structure is arranged such that the first and second pivot elements pivot relative to one another about an axis that is substantially horizontal and substantially perpendicular to a direction of travel of the vehicle in a frame of reference of the motor vehicle, when the first and second pivot elements are thus fixed to the
(Continued)

central part of the axle component and to the underframe component of the motor vehicle, respectively.

10 Claims, 1 Drawing Sheet

(51) Int. Cl.
    *B62D 21/11*     (2006.01)
    *B60G 9/02*     (2006.01)
    *B62D 25/08*     (2006.01)
    *B60C 9/02*     (2006.01)

(52) U.S. Cl.
    CPC .... *B62D 25/2027* (2013.01); *B60G 2200/324* (2013.01)

(58) Field of Classification Search
    USPC .................................................... 29/898.057
    See application file for complete search history.

(56) References Cited

U.S. PATENT DOCUMENTS

| | | | |
|---|---|---|---|
| 3,785,672 A | 1/1974 | Shakespear | |
| 5,918,692 A | 7/1999 | Sekita et al. | |
| 5,967,668 A | 10/1999 | Germano | |
| 7,207,583 B2 * | 4/2007 | Ross | B60G 7/02 267/270 |
| 7,628,457 B2 * | 12/2009 | Pochatila | B60B 35/163 180/344 |
| 8,801,013 B2 * | 8/2014 | Ramsey | B60G 99/00 280/124.11 |
| 2004/0021290 A1 * | 2/2004 | Hicks | B60G 9/00 280/438.1 |
| 2017/0088177 A1 * | 3/2017 | Caillard | B62D 25/2027 |

FOREIGN PATENT DOCUMENTS

| | | | |
|---|---|---|---|
| DE | 10036651 A1 * | 2/2002 | ............ B60G 7/00 |
| DE | 10 2009 041 702 A1 | 4/2010 | |
| EP | 0 560 242 A1 | 9/1993 | |
| FR | 2 747 616 A1 | 10/1997 | |
| GB | 2 056 382 A | 3/1981 | |
| JP | 8-332854 A | 12/1996 | |
| WO | 98/17487 A1 | 4/1998 | |

OTHER PUBLICATIONS

French Search Report dated Nov. 13, 2014 in FR 1452226 filed Mar. 18, 2014.

* cited by examiner

REAR STRUCTURE OF A MOTOR VEHICLE

The invention relates to a motor vehicle rear structure comprising an axle component with central fixing.

BACKGROUND

Vehicles provided with a rear structure comprising an axle component with central fixing, for example a de Dion axle, pivot-mounted about an axis y, are known, this axis being horizontal and perpendicular to the direction of travel in the frame of reference of the vehicle. A bearing may thus allow the axle component to rotate in y in order to compensate for any deficiencies in the flatness of the ground and/or to absorb stresses induced in a frontal impact.

An axle component with central fixing may allow a more compact design of vehicle than an H-shaped axle component.

The axle component is pivot-mounted on an engine mounting cradle, this cradle itself being fixed to the underframe components of the motor vehicle by four main fixings.

There is still a need for a vehicle that is more ecological, by optimizing the overall mass of this vehicle.

BRIEF SUMMARY

There is proposed a motor vehicle rear structure comprising:
  an underframe component for supporting a motor vehicle floor,
  an axle component comprising a central part and, on each side of the central part, two lateral parts defining, with the central part, a space to accommodate a component of the vehicle, for example an engine,
  a pivot member comprising a first pivot element and a second pivot element which are able to pivot relative to one another, the first pivot element being directly fixed to or integrated into the central part of the axle component and the second pivot element being directly fixed to or integrated into the underframe component.

The rear structure is arranged in such a way that the first and second pivot elements are able to pivot relative to one another about an axis that is substantially horizontal and substantially perpendicular to the direction of travel of the vehicle in the frame of reference of the motor vehicle, when the first and second pivot elements are thus fixed to the central part of the axle component and to the underframe component of the motor vehicle, respectively.

Stated differently, the axle component is fixed centrally and is rotationally mounted directly on the underframe component.

This structure thus has no cradle between the axle component and the underframe component. This structure can therefore be lighter in weight than in the prior art, so that the fuel or electricity consumption of the motor vehicle can be lower.

The first pivot element may comprise a shaft and the second pivot element may comprise a bearing collaborating with this shaft. Conversely, the first pivot element may comprise a bearing and the second pivot element may comprise a shaft collaborating with this bearing.

The bearing may for example comprise a tubular bearing bush which may or may not be flanged.

It is also possible to contemplate rotational guidance using rolling bearings. The pivot member may for example comprise a ball bearing.

Advantageously and nonlimitingly, the underframe component may comprise an underframe part and two flanges secured to the underframe part.

The second pivot element may be fixed to these flanges.

The second pivot element may for example comprise a rod fixed to the flanges, for example a rod inserted into two respective recesses in the flanges and held in place for example using a nut.

The second pivot element may alternatively comprise for example a ring fixed to the flanges.

The first pivot element may advantageously comprise a ring mounted around the rod and secured to or of one piece with the axle component.

Advantageously and nonlimitingly, the first pivot element may for example comprise an additional ring mounted around the central part of the axle component and of one piece with the ring mounted around the rod.

Advantageously and nonlimitingly, the central part and the two lateral parts of the axle component may define a space sized to accommodate a rear engine, for example a propulsion engine of the motor vehicle. Stated differently, the motor vehicle may comprise a rear engine, housed in the space defined by the centrally mounted axle component.

Advantageously and nonlimitingly, the underframe component may be designed also to withstand load derived from the propulsion engine.

Advantageously and nonlimitingly, the rear structure of the motor vehicle may comprise an additional pivot member comprising additional pivot elements, one of these pivot elements being fixed directly onto or integrated into the underframe component and the other of these pivot elements collaborating directly or indirectly with the engine.

For example, the other of the pivot elements may be fixed to or integrated into a means for reacting engine torque, for example an engine torque reacting link rod.

In the prior art, the cradle allows absorption of load during operation of the engine, running of the vehicle or in an impact. Thus, the underframe component is designed to perform another of the functionalities which, in the prior art, is performed by the cradle, namely reacting engine torque.

For example, one (or several) additional rod(s) may be fixed to the flanges of the underframe component and rings mounted around these rods may be secured to the engine torque reacting link rod.

In one advantageous embodiment, the flanges may be configured so that they can be obtained by pressing.

The flanges may effectively be obtained by pressing. The underframe component thus remains relatively easy to produce, even though it performs a certain number of new functions, namely rotation in y and absorption of torque reaction load.

Advantageously and nonlimitingly, the flanges may define a contact surface for contact with the underframe part of the underframe component, this contact surface being extensive enough that the flanges can be welded to the underframe part and can be welded robustly enough to absorb loading derived from the axle component in unexpected operation of the vehicle.

Advantageously and nonlimitingly, the flanges may define turned-up edges, for example 1 cm thick. Such a dropped edge may make it possible to stiffen the periphery of the flanges.

Also proposed is a motor vehicle comprising a rear structure as defined hereinabove.

The vehicle may advantageously comprise a rear propulsion engine, housed in the space defined by the axle component.

BRIEF DESCRIPTION OF THE DRAWINGS

The invention will be better understood with reference to the figures which illustrate embodiments given by way of nonlimiting example.

DETAILED DESCRIPTION

From one figure to another, identical references will be used to denote elements that are identical or similar in shape or in function.

In the present application, the axes x, y, z are the axes conventionally used in the automotive field, considered in the frame of reference of the motor vehicle, which means to say that the axis x is the front-rear axis of the vehicle, corresponding to the direction of travel when the steering wheel is straight, that the axis z is collinear with the gravity vector and of opposite sense to this gravity vector when the vehicle is standing with its wheels on flat ground, and that the axis y, or lateral axis, is perpendicular to the axes x and z.

Figure 1:
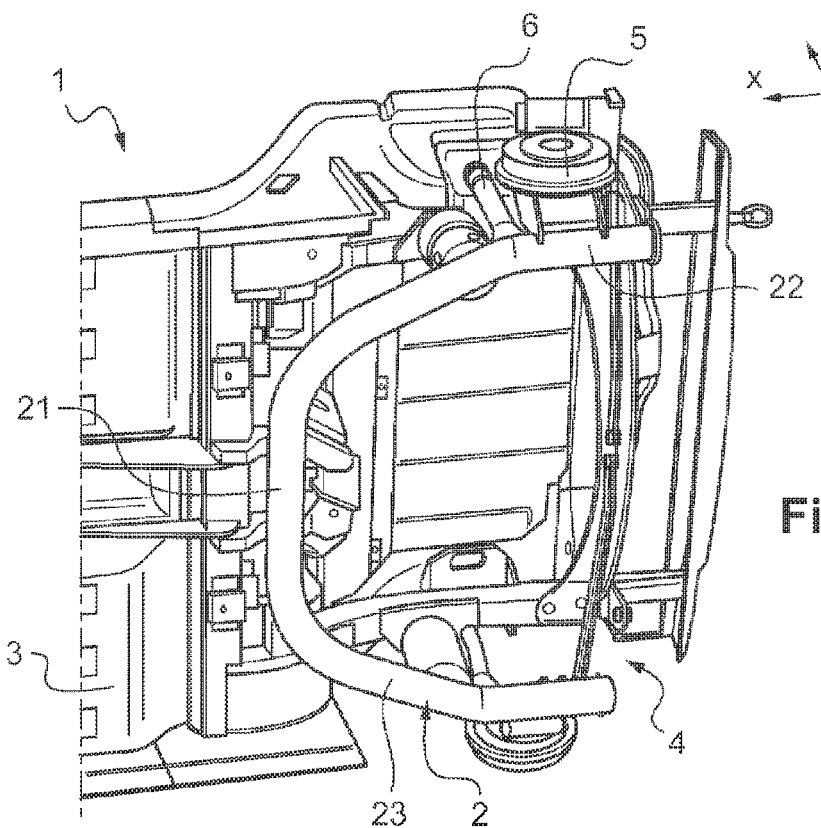
FIG. 1 is a perspective view of a rear part of a motor vehicle according to one embodiment of the invention, not all of the components having been depicted.

With reference to FIG. 1, a motor vehicle rear structure 1 comprises an axle component with central fixing, for example a de Dion axle 2, and an underframe component 3.

The axle 2 is C-shaped overall and comprises a central part 21 and two lateral parts 22, 23. The de Dion axle 2 defines a space 4 to house a propulsion engine (not depicted).

The de Dion rear axle 2 is advantageous in relation to an H-shaped rear axle in that more space is freed up in the rear part of the motor vehicle in order to be able to install the engine, thus making it possible to design vehicles that are more compact.

The rear part of the motor vehicle also comprises axle hubs 5 and shock absorbers 6.

The de Dion axle 2 is pivot mounted directly on the underframe component 3. The rear structure for this purpose comprises a pivot member that has not been depicted in FIG. 1 and that will be described with reference to FIG. 2.

Figure 2:
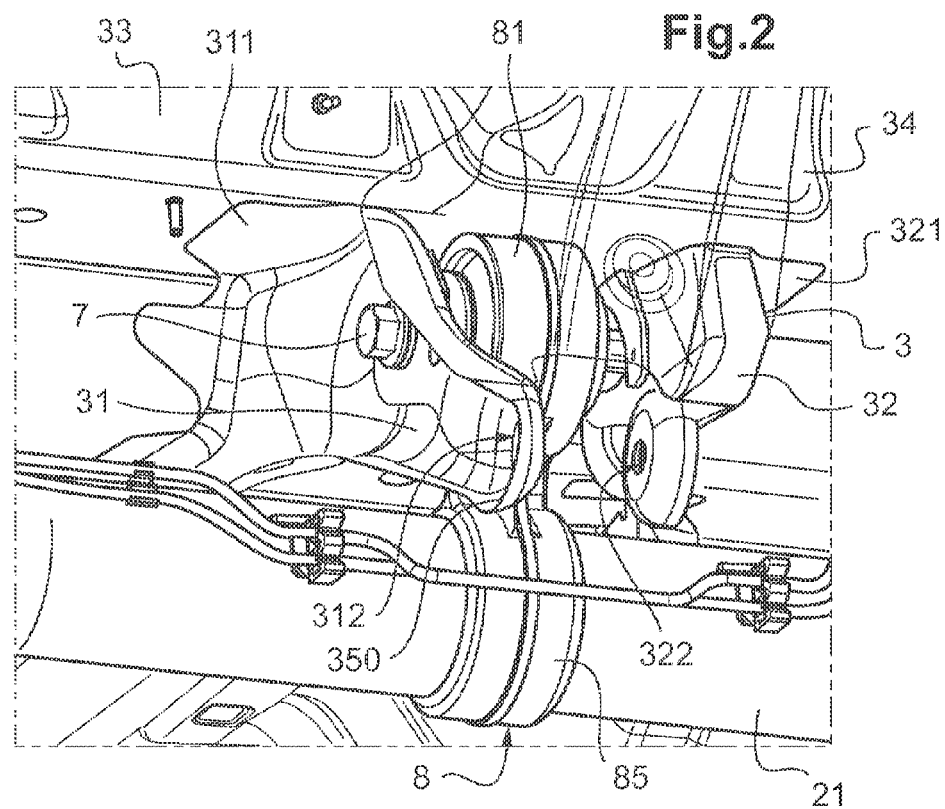
FIG. 2 is a perspective view of a portion of rear structure according to the embodiment of FIG. 1.

More specifically, with reference to FIG. 2, two flanges 31, 32 are welded to an underframe part 33 of the underframe component 3. These flanges 31, 32 define two recesses facing one another to house the respective two ends of a rod that is not visible in FIG. 2.

A nut system 7 comprising, for example, an M14 nut allows this rod, in this instance a fixing screw, to be immobilized on the flanges 31, 32.

This rod is an element of a pivot member 8 which also comprises a ring element 81, this element 81 comprising a ring rotationally mounted around the rod. Stated differently, the rod and the ring 81 form a shaft-bearing system. The ring element further comprises an additional ring 85 welded to the central part 21 of the de Dion axle 2.

Thus, this pivot member 8 allows a pivoting movement between the de Dion axle 2 and the underframe component 3 about an axis substantially parallel to the axis y of the vehicle.

This rotation in y may make it possible to compensate for any deficiencies in the flatness of the ground and/or to absorb load induce in a frontal impact.

The two flanges 31, 32 are pressed and welded by spot welds to the underframe part 33, more specifically to an underframe cross member 34.

The flanges 31, 32 have been designed so they define contact surfaces 311, 321, that are relatively extensive so that these flanges 31, 32 can be welded relatively robustly to the cross member 34.

The flanges 31, 32 also define orifices 312, 322 to accommodate an additional rod. This additional rod forms part of an additional pivot member coupling the underframe component 3 to an engine torque reacting link rod which has not been depicted. This additional rod is not depicted in FIG. 2.

When the motor vehicle is used, load on the rear axle 2 which is the result of the lack of flatness of the road surface is transmitted to the underframe 3 via the rotation member 8, also referred to as the Point A interface.

This interface has therefore been engineered to withstand this type of load.

In the event of a frontal or rear impact, this interface is likely to be stressed. Thus, the flanges 31, 32 have been designed using materials and with dimensions suited also to withstanding relatively high load. The flanges 31, 32 may thus be made from pressed steel sheet of the order of 2.5 mm thick.

The number of components can thus be relatively low.

The flanges 31, 32 define turned-up edges 350, approximately 1 centimeter thick. These turned-up edges, or dropped edges 350, are obtained by pressing.

Alternatively, rather than a screw-nut system it is possible to conceive of welding the ends of a rod to the flanges 31, 32.

The invention claimed is:

1. A rear structure of a motor vehicle, comprising:
an underframe component for supporting a motor vehicle floor;
an axle component comprising a central part and, on each side of the central part, two lateral parts defining, with the central part, a space to accommodate a component of the motor vehicle; and
a pivot member comprising a first pivot element and a second pivot element which are able to pivot relative to one another, the first pivot element including a ring mounted on the second pivot element and an additional ring encircling the central part of the axle component and of one piece with the ring, and the second pivot element being directly fixed to or integrated into the underframe component,
in which
the rear structure is arranged in such a way that the first and second pivot elements are able to pivot relative to one another about an axis that is substantially horizontal and substantially perpendicular to a direction of travel of the motor vehicle in a frame of reference of the motor vehicle, when the first and second pivot elements are thus fixed to the central part of the axle component and to the underframe component of the motor vehicle, respectively.

2. The rear structure as claimed in claim 1, in which
the underframe component comprises an underframe part and two flanges secured to the underframe part, and
the second pivot element is fixed to said flanges.

3. The rear structure as claimed in claim 2, in which
the second pivot element comprises a rod fixed to or of one piece with the flanges, and the ring of the first pivot element is mounted around the rod and secured to or of one piece with the axle component.

4. The rear structure as claimed in claim 2, in which the flanges are configured so that they can be obtained by pressing.

5. The rear structure as claimed in claim 2, in which the flanges each define a contact surface for contact with the underframe part of the underframe component, the contact surface being extensive enough that the flanges can be welded to the underframe part and can be welded robustly enough to absorb loading derived from the axle component in unexpected operation of the motor vehicle.

6. The rear structure as claimed in claim 2, in which the flanges define turned-up edges.

7. The rear structure as claimed in claim 1, in which the axle component is arranged in such a way that the central part and the two lateral parts of said axle component define a space sized to accept a propulsion engine of the motor vehicle.

8. The rear structure as claimed in claim 7, in which the rear structure of the motor vehicle comprises an additional pivot member comprising additional pivot elements, one of said additional pivot elements being fixed to or integrated into the underframe component and the other of said additional pivot elements being fixed to or integrated into an engine torque reacting link rod.

9. A motor vehicle, comprising:
the rear structure as claimed in claim 1.

10. A rear structure of a motor vehicle, comprising:
an underframe component for supporting a motor vehicle floor;
an axle component comprising a central part and, on each side of the central part, two lateral parts defining, with the central part, a space to accommodate a component of the motor vehicle; and
a pivot member comprising a first pivot element and a second pivot element which are able to pivot relative to one another, the first pivot element being directly fixed to or integrated into the central part of the axle component and the second pivot element being directly fixed to or integrated into the underframe component,
in which
the rear structure is arranged in such a way that the first and second pivot elements are able to pivot relative to one another about an axis that is substantially horizontal and substantially perpendicular to a direction of travel of the motor vehicle in a frame of reference of the motor vehicle, when the first and second pivot elements are thus fixed to the central part of the axle component and to the underframe component of the motor vehicle, respectively,
the axle component is arranged in such a way that the central part and the two lateral parts of said axle component define a space sized to accept a propulsion engine of the motor vehicle, and
the rear structure of the motor vehicle comprises an additional pivot member comprising additional pivot elements, one of said additional pivot elements being fixed to or integrated into the underframe component and the other of said additional pivot elements being fixed to or integrated into an engine torque reacting link rod.

* * * * *